United States Patent
Wardenburg et al.

(10) Patent No.: US 9,363,953 B2
(45) Date of Patent: Jun. 14, 2016

(54) VENTILATED GROW LIGHT HOUSING

(71) Applicant: HYDROFARM, INC., Petaluma, CA (US)

(72) Inventors: Peter Wardenburg, Novato, CA (US); Jason Mengelkoch, Sonoma, CA (US)

(73) Assignee: HYDROFARM, INC., Petaluma, CA (US)

(*) Notice: Subject to any disclaimer, the term of this patent is extended or adjusted under 35 U.S.C. 154(b) by 284 days.

(21) Appl. No.: 14/038,413

(22) Filed: Sep. 26, 2013

(65) Prior Publication Data
US 2015/0082692 A1    Mar. 26, 2015

(51) Int. Cl.
*F21V 29/00* (2015.01)
*A01G 9/24* (2006.01)
*A01G 9/20* (2006.01)
*A01G 9/26* (2006.01)
*F21V 7/00* (2006.01)
*F21V 29/505* (2015.01)
*F21V 29/83* (2015.01)

(52) U.S. Cl.
CPC *A01G 9/241* (2013.01); *A01G 9/20* (2013.01); *A01G 9/26* (2013.01); *F21V 7/0016* (2013.01); *F21V 29/505* (2015.01); *F21V 29/83* (2015.01)

(58) Field of Classification Search
CPC ........... A01G 9/241; A01G 9/20; A01G 9/26; F21V 29/505; F21V 29/503; F21V 29/83; F21V 7/0016
USPC .................................................. 362/101, 373
See application file for complete search history.

(56) References Cited

U.S. PATENT DOCUMENTS

| | | | |
|---|---|---|---|
| 6,247,830 B1 | 6/2001 | Winnett | |
| 6,595,662 B2* | 7/2003 | Wardenburg | A01G 7/045 362/218 |
| 8,322,011 B2* | 12/2012 | Hargreaves | A01G 7/045 29/428 |
| 2004/0240214 A1 | 12/2004 | Whitlow | |
| 2008/0205071 A1 | 8/2008 | Townsley | |
| 2009/0116250 A1 | 5/2009 | Hargreaves et al. | |

* cited by examiner

*Primary Examiner* — Ali Alavi
(74) *Attorney, Agent, or Firm* — Craig M. Stainbrook; Stainbrook & Stainbrook, LLP

(57) ABSTRACT

A grow light housing with passive cooling, including a shell having a reflective interior surface, a lower opening for directing light downwardly onto plants, and at least one ventilation opening in an upper portion. A grow light socket is coupled to the housing so as to position a grow light directly below the ventilation opening, and a reflective baffle is interposed between the ventilation opening and the grow light bulb. The baffle is spaced apart from the ventilation opening and housing interior surface so as to form a gap through which heated air may escape. The reflective baffle is configured in such a way that incident light is reflected away from the ventilation opening, into the housing interior space and either directly out the housing opening or indirectly out the housing opening after first reflecting off the reflective interior surface of the housing shell.

10 Claims, 13 Drawing Sheets

VENTILATED GROW LIGHT HOUSING

CROSS REFERENCES TO RELATED APPLICATIONS

Not applicable. The present application is an original and first-filed United States Utility Patent Application.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

1. Field of the Invention

The present invention relates generally to agricultural lighting, and more particularly to agricultural light housings, and still more particularly to a grow light housing having ventilation slots for passive ventilation and reflective elements disposed over the ventilation opening, the combination configured in such a way as to capture and disperse light energy that would otherwise be lost.

2. Background Discussion

Indoor hydroponic and soil-based plant growing systems are now indispensable tools in both horticulture and agriculture. Large scale indoor growing systems are employed to provide produce out of season or in otherwise unsuitable climates, as well as to provide highly controlled growing conditions that optimize plant health and product yield, as well as to minimize exposure to risk of loss from insect and other herbivorous pests, frosts, hail, and so forth.

Indoor plant growing systems include, as essential elements, plant nutrient media and their containers, climate (humidity and temperature) control, lighting, and hydration. Large or full-sized plants, and those indigenous to latitudes and growing regions characterized by long periods of light sufficient for photosynthesis, frequently require high intensity lights, preferably full spectrum, for optimal growing conditions. However, high intensity lights generate considerable waste heat that can create injurious high temperatures in the immediate vicinity of the plants under the high intensity light. Additionally, high intensity lights give rise to temperature differentials throughout a facility in which diverse species are grown under varying lighting conditions. Thus, when exacting control over temperature in the growing environment is important, a cooling system may be employed to siphon off and eliminate waste heat and thereby to prevent a general rise in temperature in the growing facility and to prolong bulb life.

Solutions to the foregoing problem have been provided in the form of large systems that cool arrays of lights, and to individual cooling systems, generally in the form of fans and venting.

For instance, U.S. Pat. No. 6,247,830, to Winnett, et al., teaches an air-cooled light fixture having a transparent borosilicate glass cylinder surrounding a high intensity lamp. Attached to the ends of the cylinder are end plates for supporting the light fixture from a ceiling, each having a hose flange for connecting a hose to each end plate. On the inside wall of the transparent cylinder is a thermal protector device for disconnecting electrical power to the high intensity discharge lamp when a temperature inside the transparent cylinder reaches a predetermined temperature limit.

U.S. Pat. No. 6,595,662, to one of the present inventors, Wardenburg, discloses a double-walled grow light housing with air flow cooling system having an exterior shell with an air inlet and a hot air exhaust outlet, and a specular interior insertable into the shell. The sides of the specular insert are spaced apart from the walls of the shell so as to form a double-walled housing having air cooling chambers and vents which facilitate the movement and exhaust of air heated by high intensity light bulbs. The specular insert is configured with sides that cooperate with the shell to form air cooling spaces, and includes vents that allow hot air to circulate away from the bulb and outwardly into the air cooling chambers. There the air mixes with cooler air drawn into the cooling chambers through air inlets in the exterior shell; after mixing the air is vented upwardly and out through a hot air exhaust in the shell.

U.S. Pat. Appl. Pub. No. 20090116250, by Hargreaves, shows an aerodynamic lamp socket assembly including a lamp socket and a grow lamp positioned and attached within a horticulture light fixture to split a cooling stream of air around the lamp socket and grow lamp reducing cooling air resistance, turbulence, and disturbance.

U.S. Pat. Appl. Pub. No. 20080205071, by Townsley, discloses a lighting apparatus that includes an outer housing with an intake vent and an exhaust vent, an inner housing disposed within the interior of the outer housing, and an air path between the outer housing and the inner housing. The outer housing includes a cover, a top and a plurality of side walls forming the interior, and the inner housing includes a top and a plurality of side walls that correspond to the top and plurality of side walls of the outer housing. The air entering the outer housing through the intake vent travels along the air path and exits the outer housing through the exhaust vent.

U.S. Pat. Appl. Pub. No. 20040240214, by Whitlow, teaches a light fixture with an outer housing and an inner housing disposed within the outer housing and a lamp socket attached to the inner housing. An opening in the outer housing connects to a ventilation system and channels between walls and sides of the outer and inner housings receive air from the ventilation system through the opening, wherein a dedicated cooling system cools only the area immediately surrounding the plant or plants under the high intensity light.

The foregoing patents and published patent applications reflect the current state of the art of which the present inventors are aware. Reference to, and discussion of, these references is intended to aid in discharging Applicants' acknowledged duties of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

The present invention is an agricultural/horticultural indoor grow light housing having passive ventilation provided by an elongate ventilation slot disposed immediately above a horizontally disposed light bulb. Positioned between the light bulb and the ventilation slot is a reflective baffle that permits heated air to flow up and through the ventilation slot while reflecting incident light from the bulb either directly out of the housing and onto plants or into other reflective portions of the housing interior surface for eventual reflection out from the housing. This brief summary broadly and succinctly sets out the most important features of the present invention so that the detailed description that follows may be better understood, and so that the present contributions to the art may be better appreciated. There are additional features of the invention that will be described in the detailed description of the preferred embodiment of the invention. The fundamental aspects of the invention, along with the various features and structures that characterize the invention, are pointed out with particularity in the claims annexed to and forming a part of this disclosure. For a better understanding of the present invention, its advantages and the specific objects attained by its uses, reference should be made to the accompanying drawings and descriptive matter in which there are illustrated the preferred embodiment.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
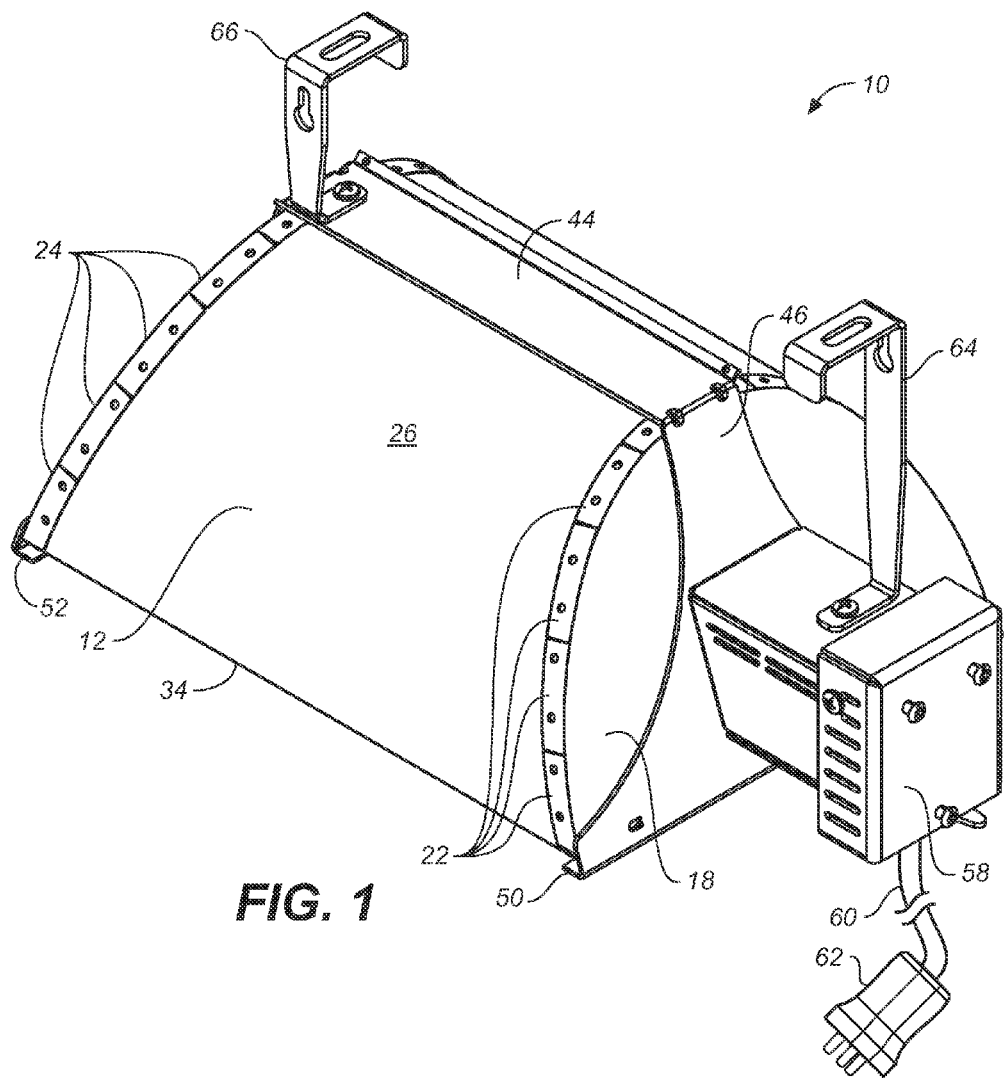
FIG. 1 is an upper left front perspective view of the light housing of the present invention.
Figure 2:
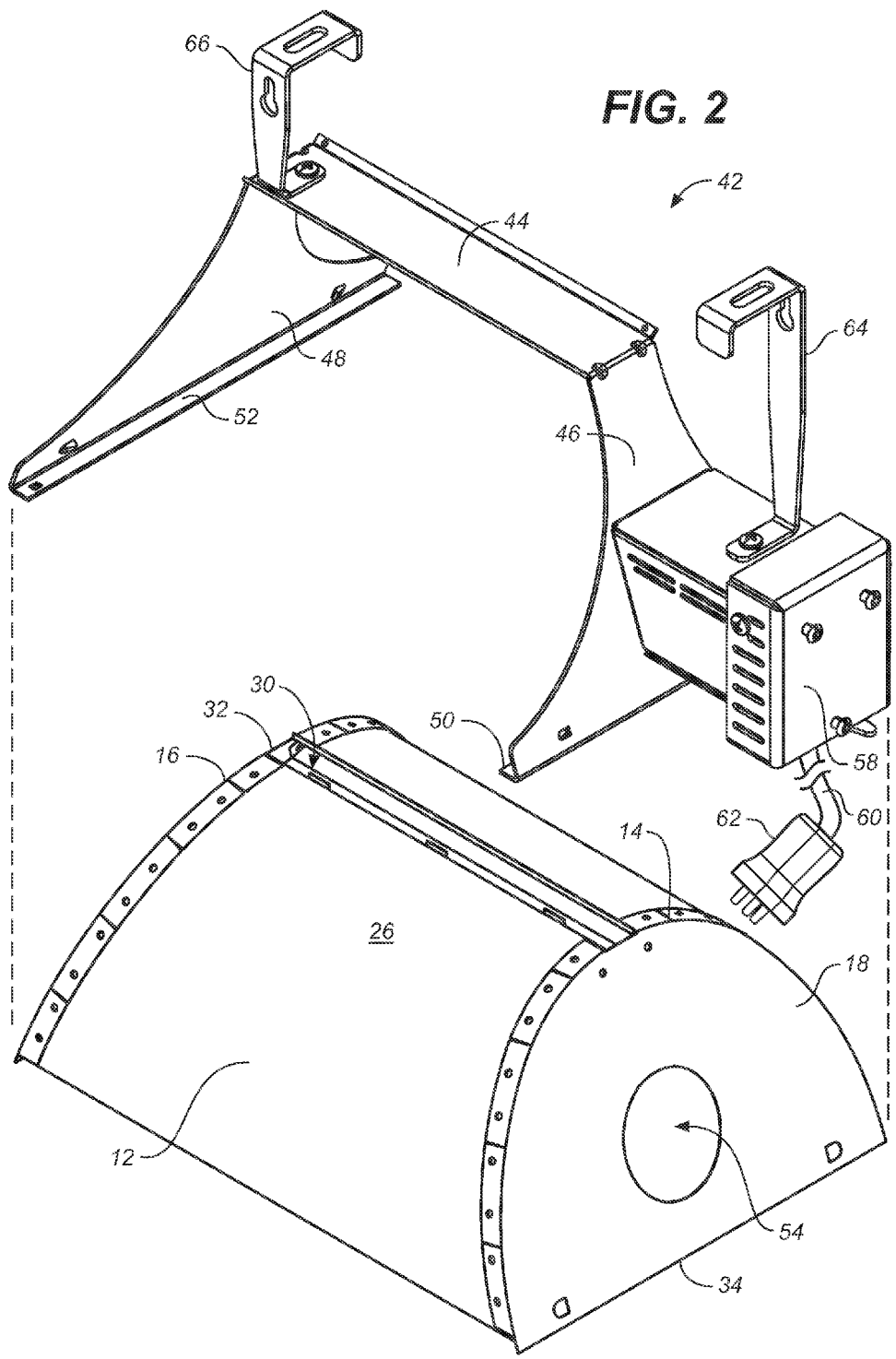
FIG. 2 is a partially exploded upper left front perspective view thereof, showing the light housing with the ceiling mount and hanging bracket removed.

Referring to FIGS. 1 through 13, wherein like reference numerals refer to like components in the various views, there is illustrated a new and improved indoor grow light housing, generally denominated 10 herein. The views collectively show a preferred embodiment of the light housing.

In the preferred embodiment, the light housing 10 includes a housing shell 12, preferably fabricated from a unitary curved panel, and having arcuate front and rear edges 14, 16, which may range from substantially parabolic to generally semicircular in shape. Front and rear housing panels, 18, 20, each have an arcuate edge substantially conforming to the housing shell front and rear edges are slotted to form a plurality of flanges 22, 24 that are folded onto the shell outer surface 26 and provided with holes for riveting or screwing or otherwise affixing the front and rear panels to the housing shell.

The housing shell includes a specular interior surface 28 and a ventilation slot 30 disposed at the housing vertex 32. One or the other or both of left and right lower edges 34, 36 of the housing shell are disposed slightly above the lower edges 38, 40 of the front and rear housing panels.

A hanger 42 having a horizontally disposed longitudinal upper bar 44 and front and rear hanger panels 46, 48 are disposed on and affixed to the exterior of the housing shell. The front and rear hanger panels include, respectively, an inwardly bent lower front flange 50 and rear flange 52, the former bending under the lower edge of the front housing panel 18 and the left and right edges 34, 36 of the housing shell, and the latter which bends under the lower edge of the rear housing panel 20 and the left and right edges of the housing shell. The spacing between the front and rear flanges 50, 52, and the right edge of the housing panel and the lower edges of the front and rear housing panels, defines front and rear shelves onto which a transparent lens may be slidably disposed.

Figure 3:
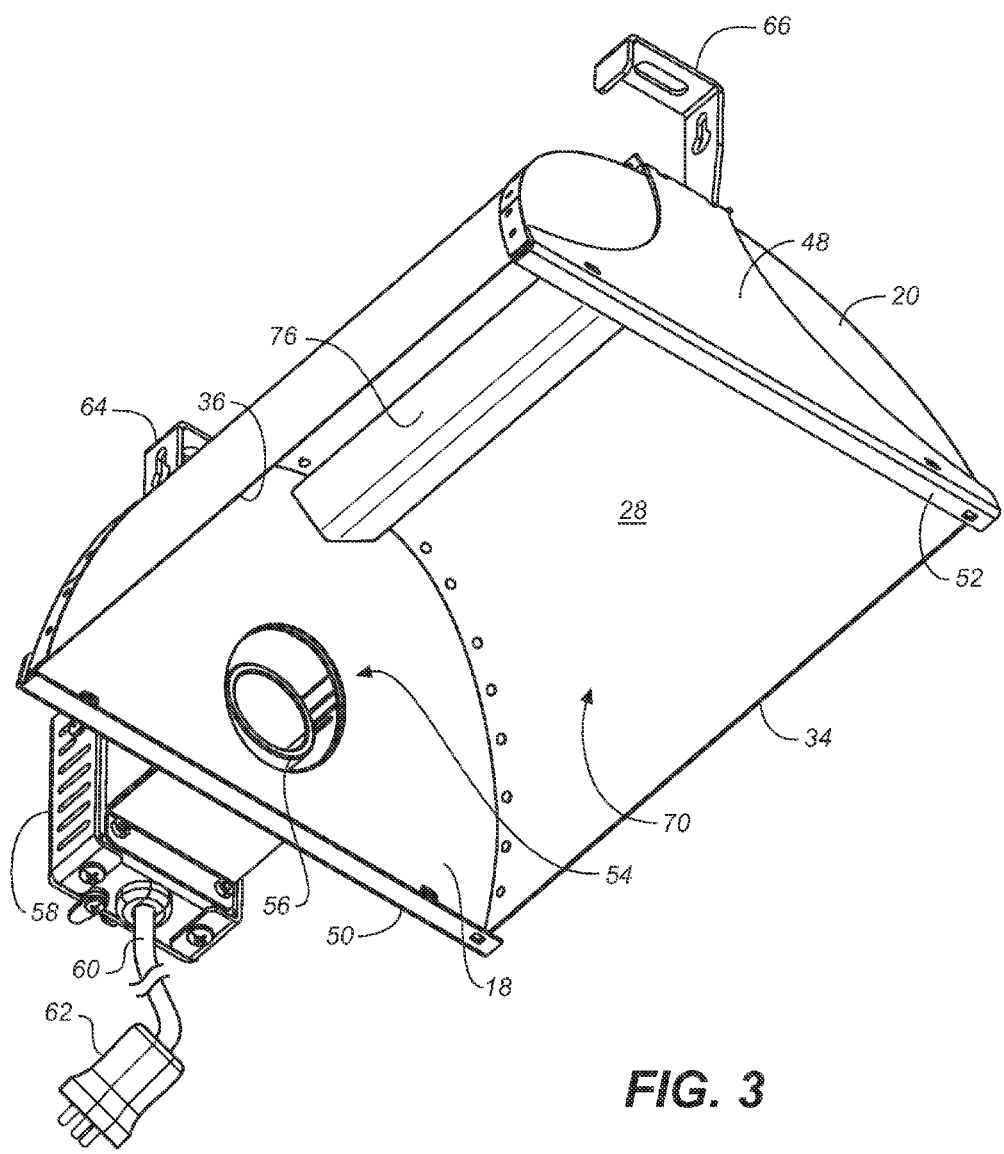
FIG. 3 is a lower right rear perspective view of the inventive light housing.
Figure 4:
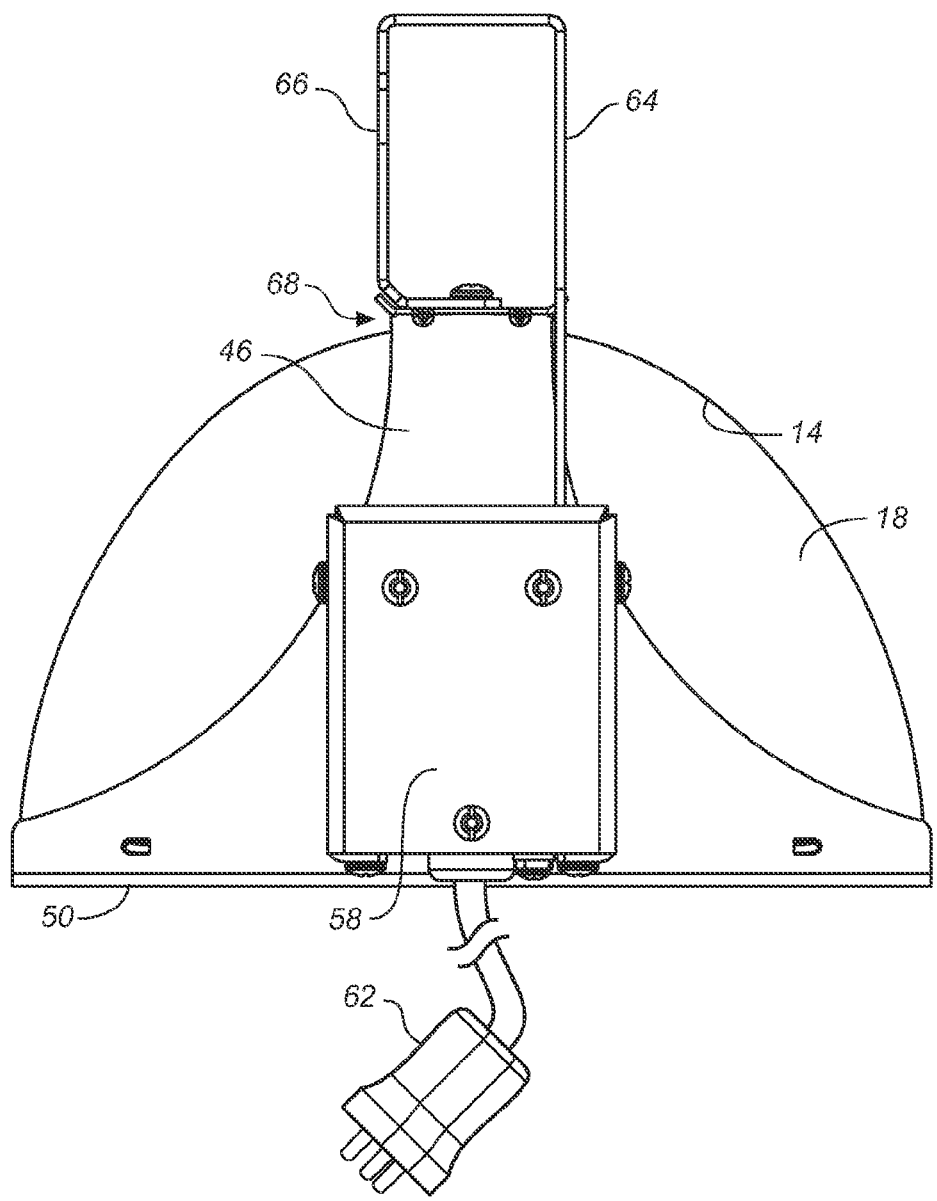
FIG. 4 is a front side view in elevation thereof.
Figure 5:
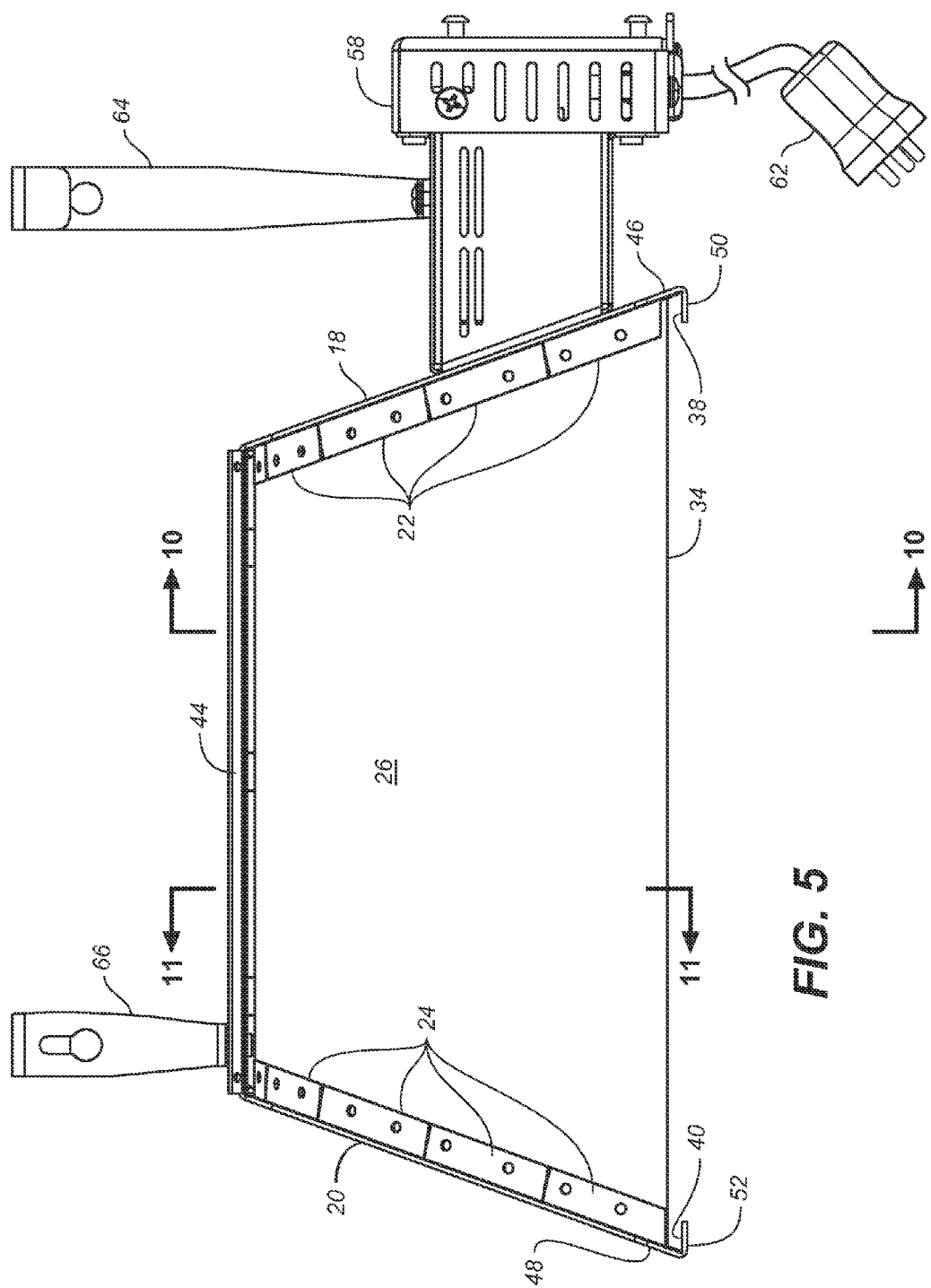
FIG. 5 is a left side view in elevation thereof.
Figure 6:
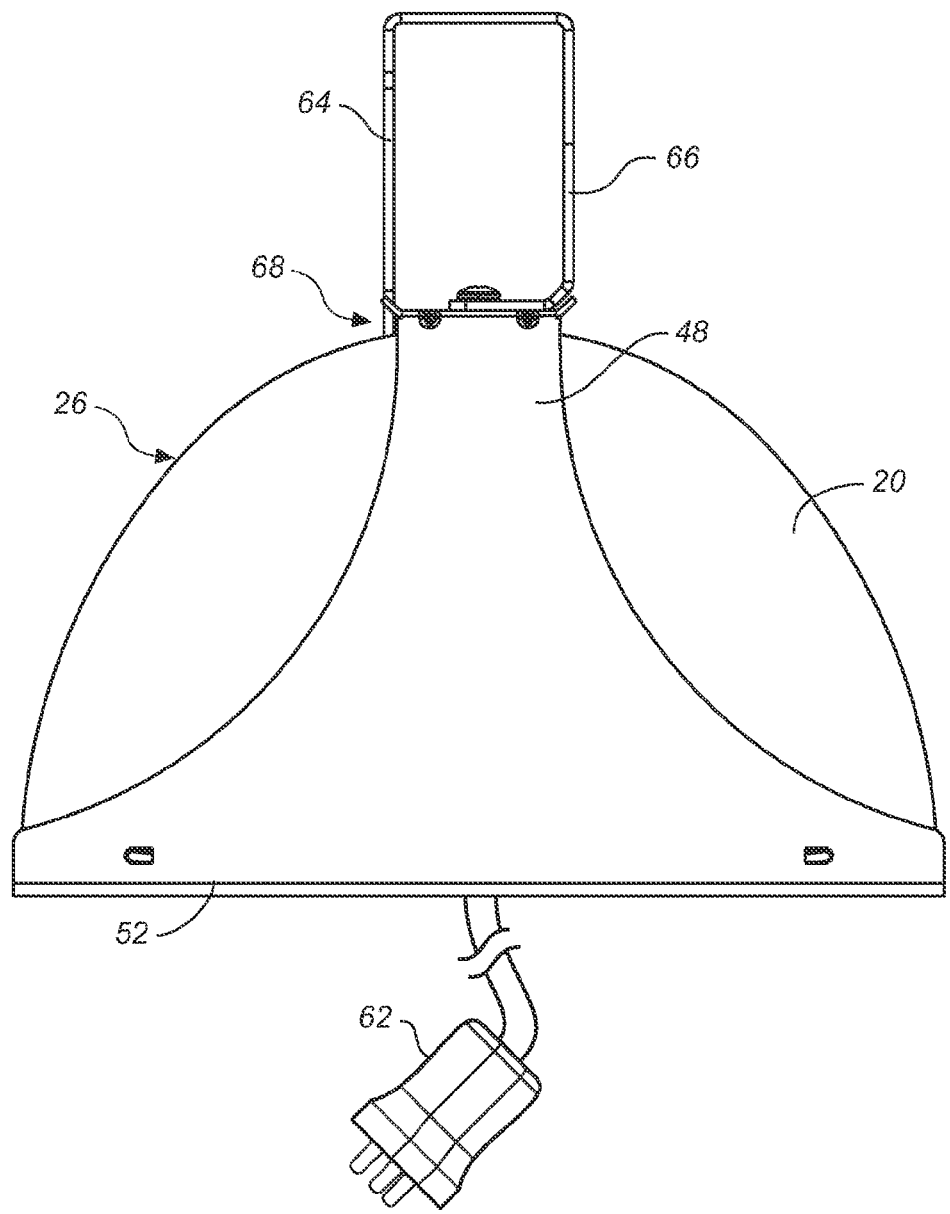
FIG. 6 is a rear side view in elevation thereof.
Figure 7:
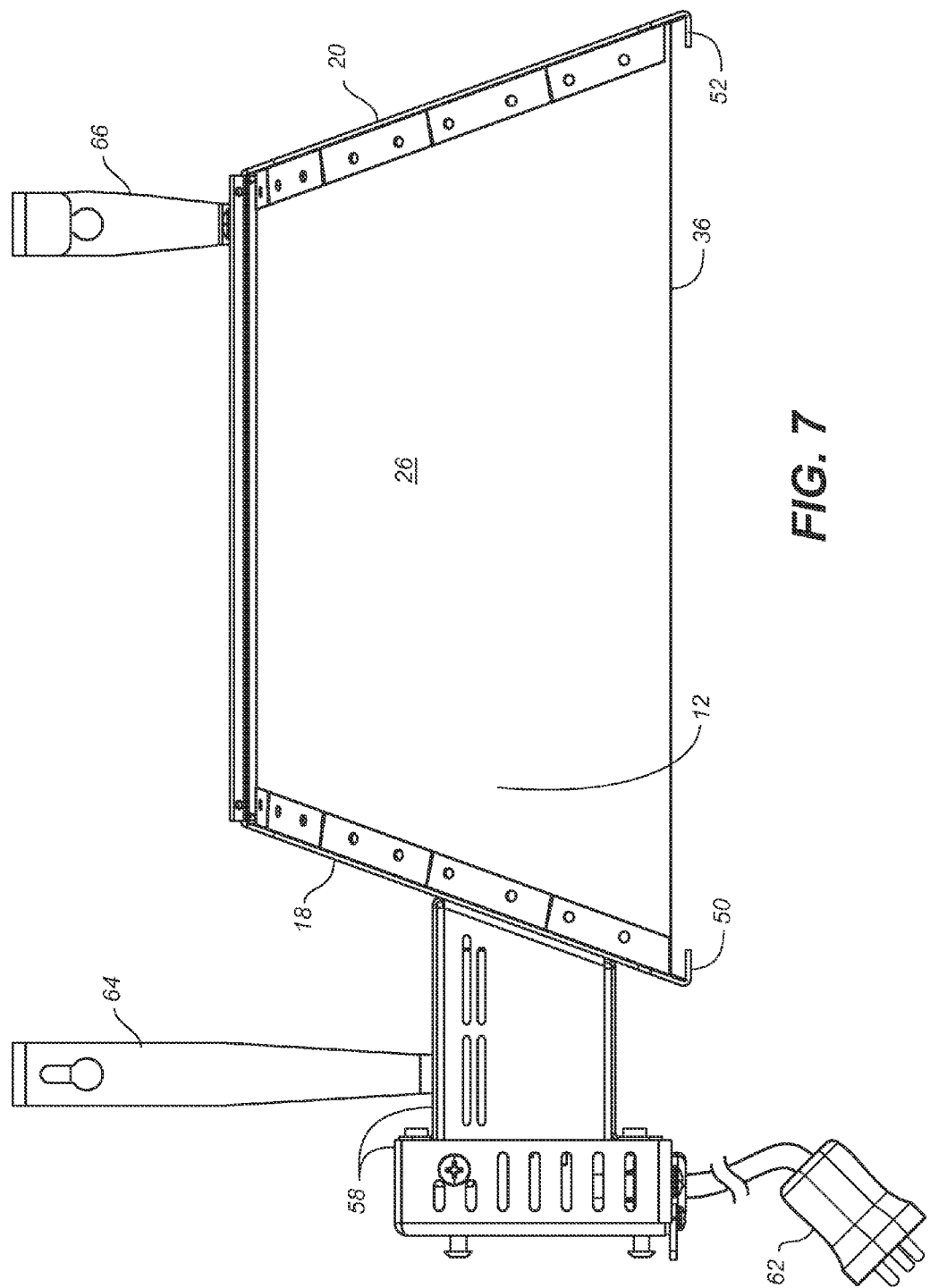
FIG. 7 is a right side view in elevation thereof.
Figure 8:
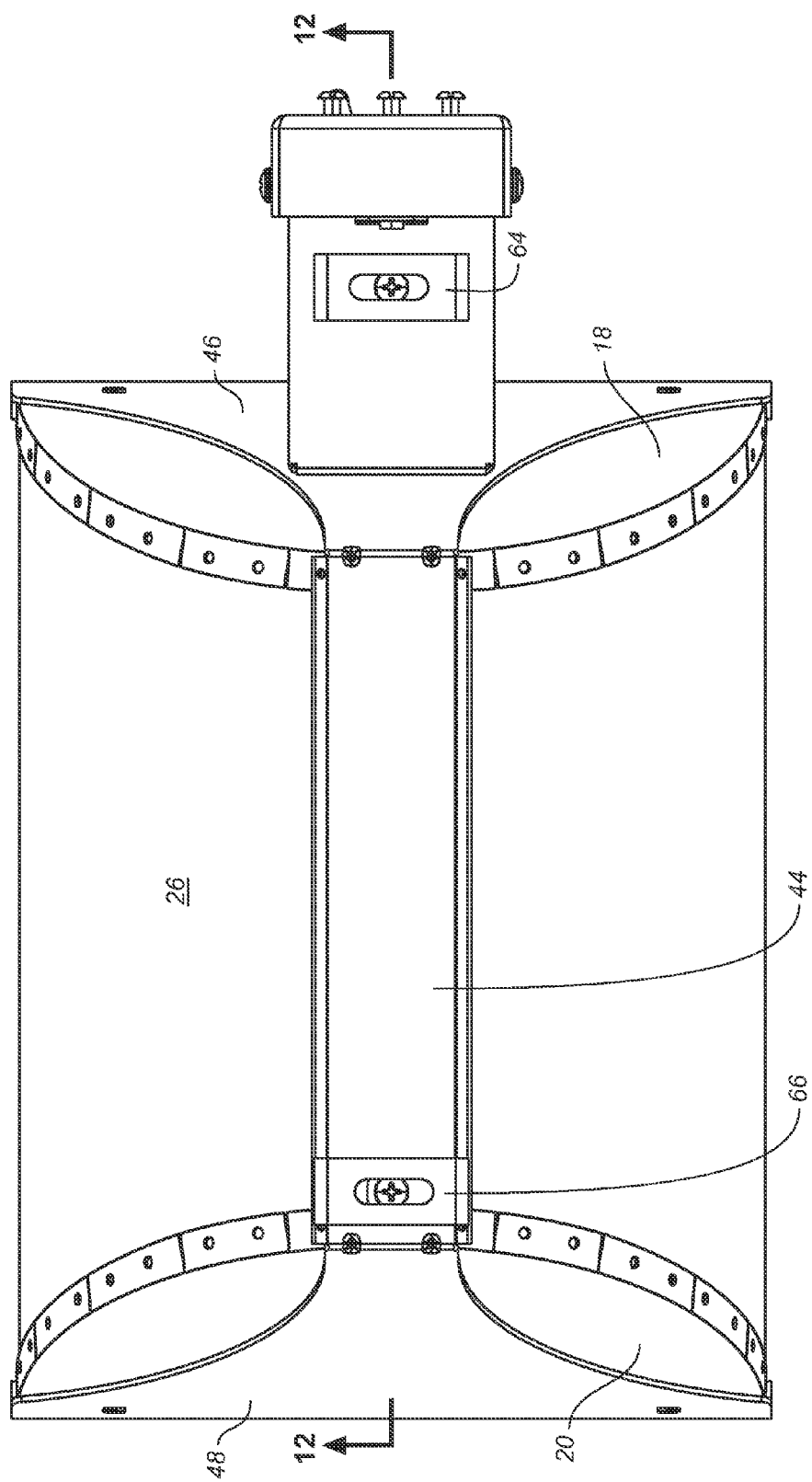
FIG. 8 is a top plan view thereof.
Figure 9:
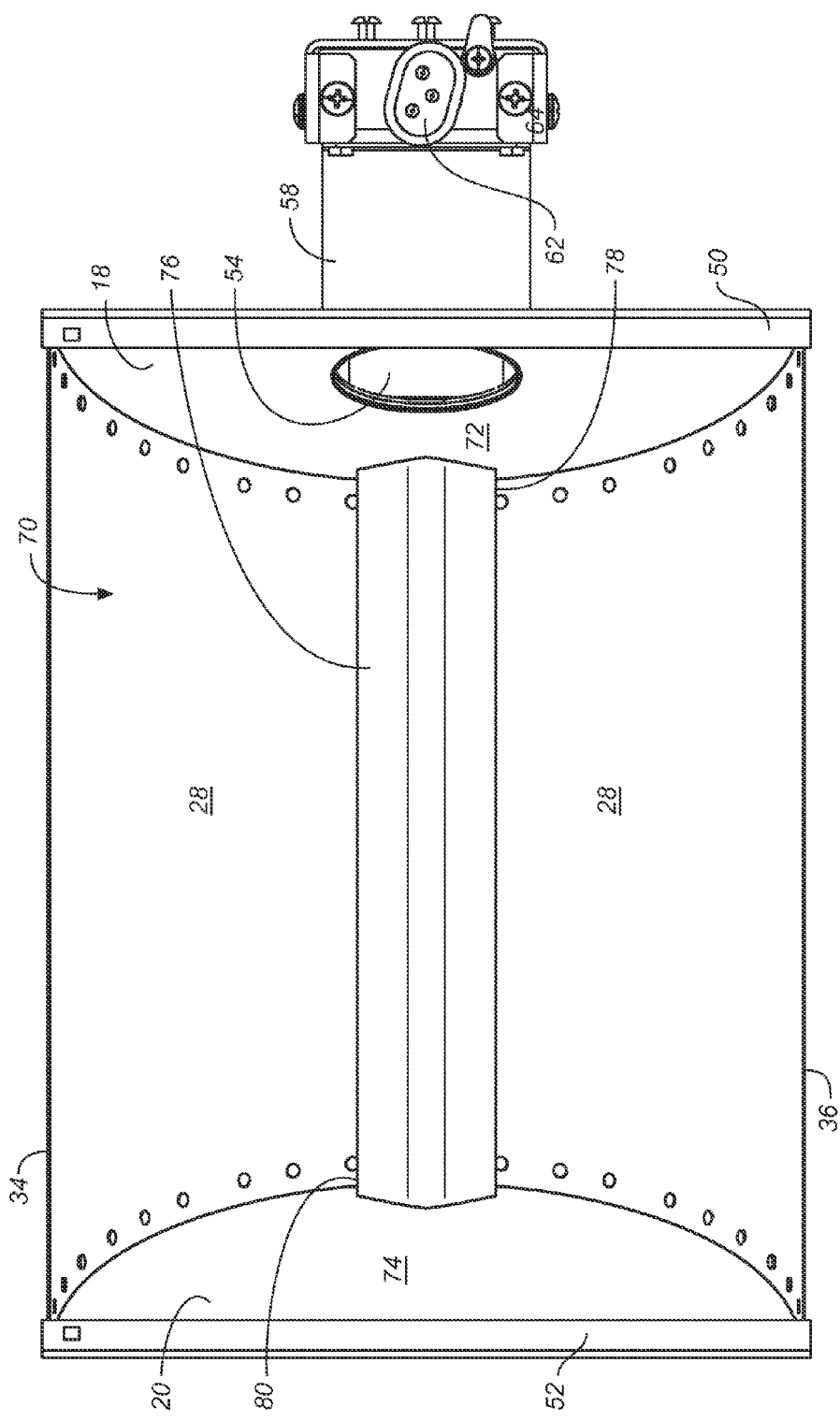
FIG. 9 is a bottom plan view thereof.
Figure 10:
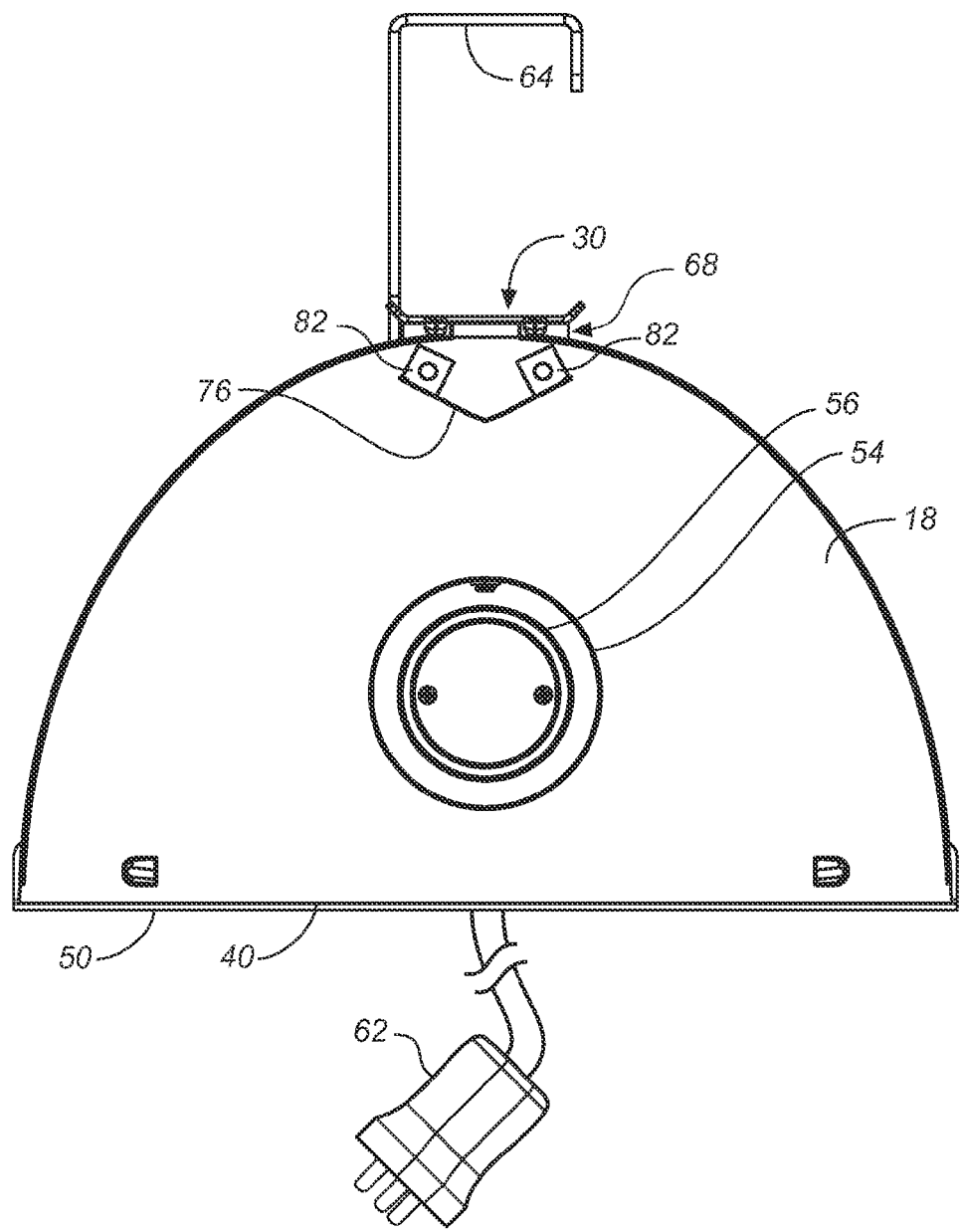
FIG. 10 is a cross-sectional review view in elevation taken along section line 10-10 of FIG. 5.
Figure 11:
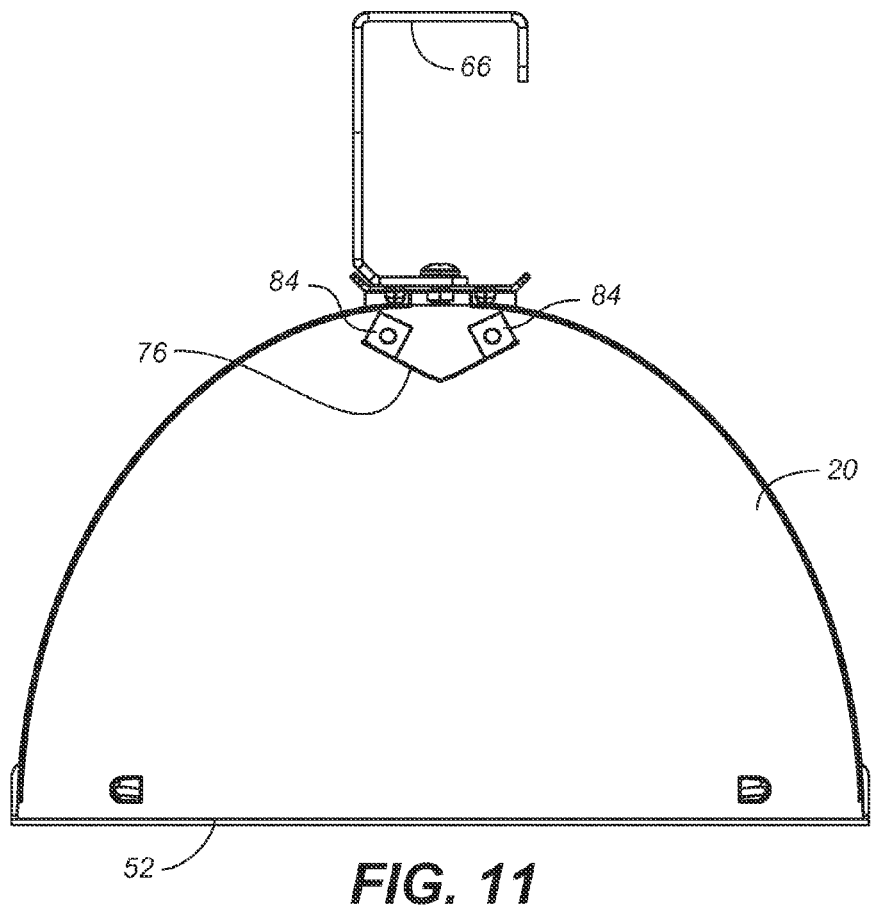
FIG. 11 is a cross-sectional front view in elevation taken along section line 11-11 of FIG. 5.
Figure 12:
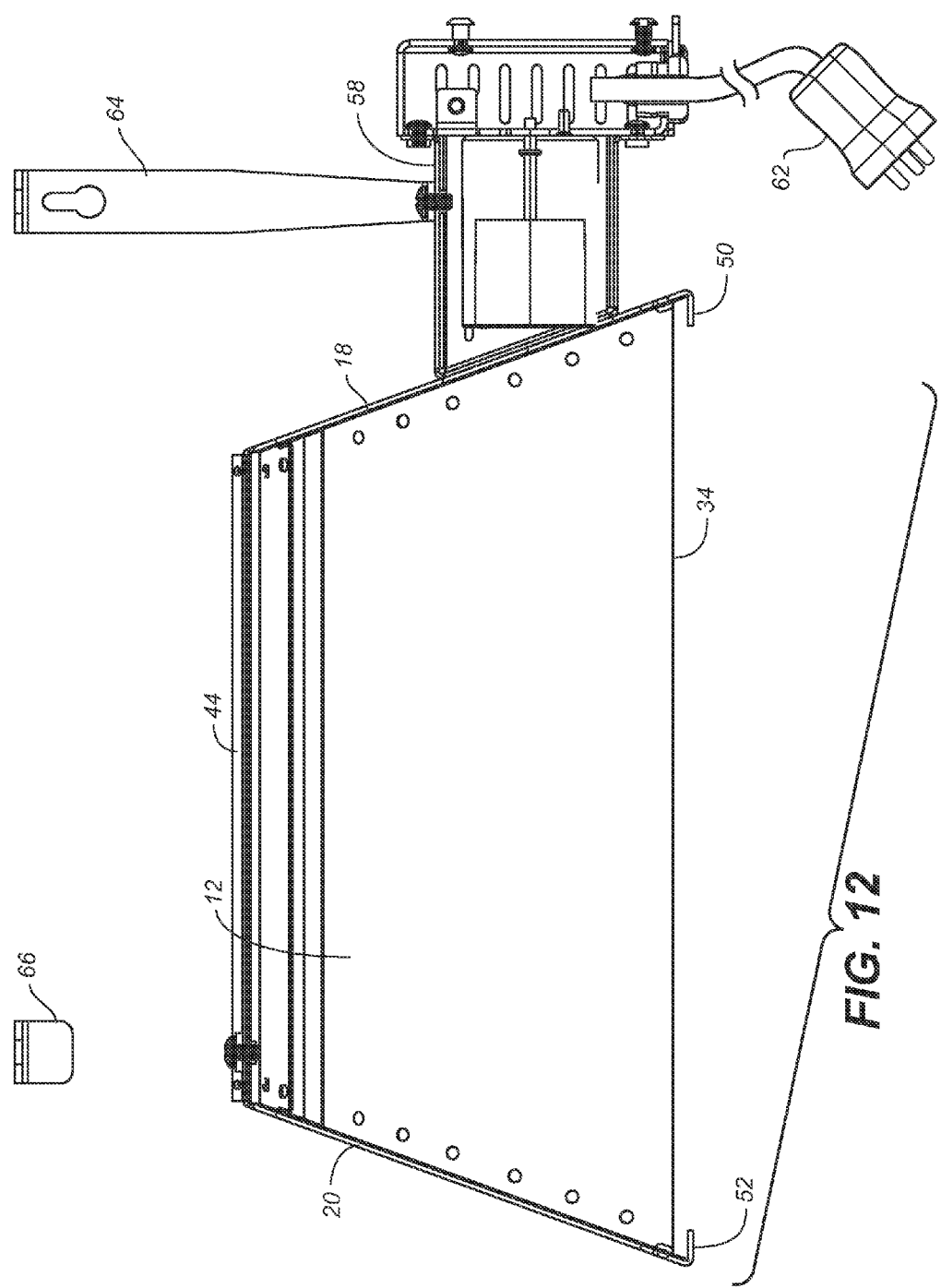
FIG. 12 is a cross-sectional left side view in elevation taken along section line 12-12 of FIG. 8.
Figure 13:
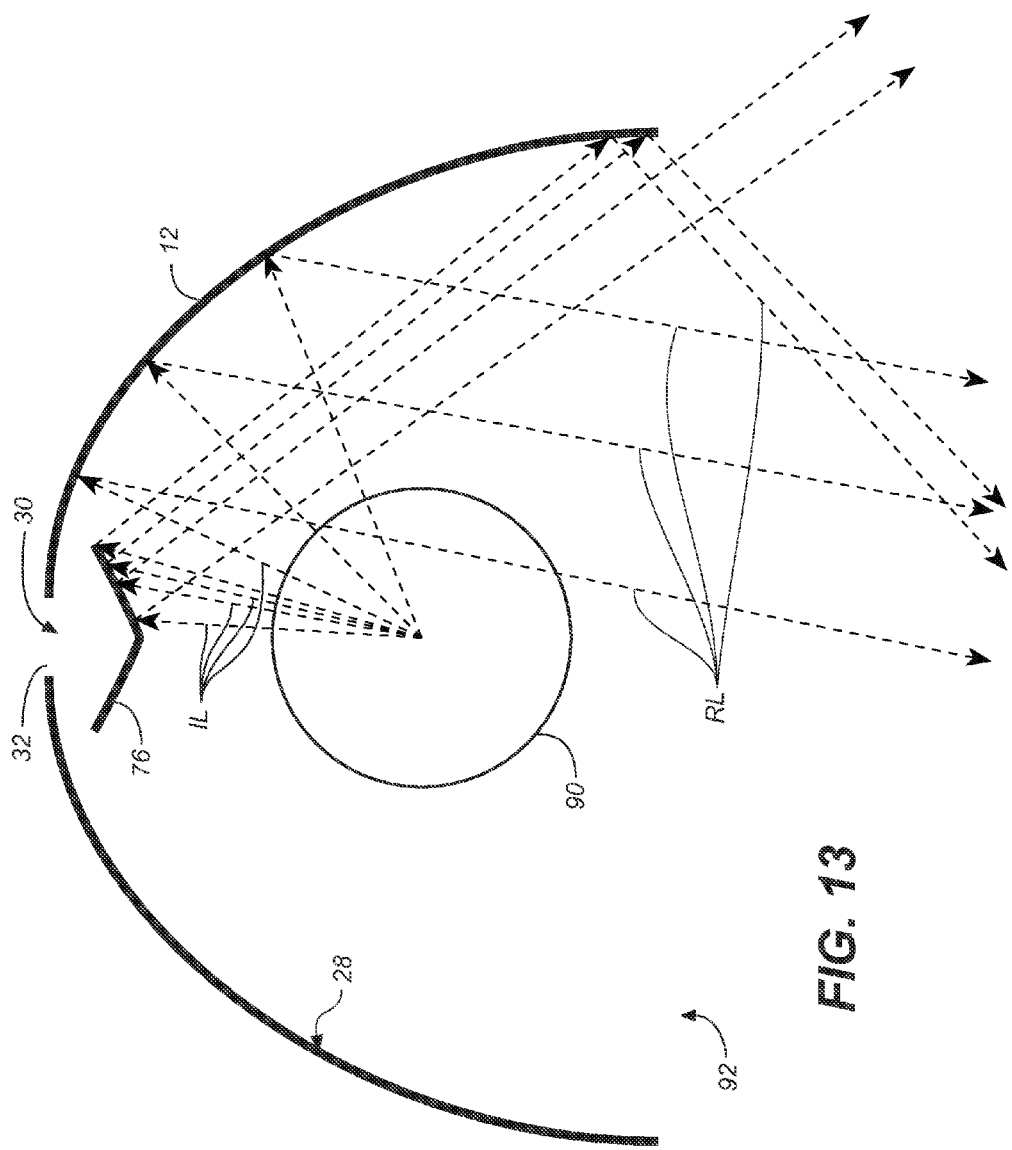
FIG. 13 is a highly schematic cross-sectional front or rear end view in elevation showing how light from a bulb is reflected by the specular interior surface and vent cover of the present invention.

Referring to FIGS. 1 and 3, it will be seen that front housing panel 18 includes a hole 54 through which a mogul base socket 56 may be disposed or nearly disposed. The base socket is part of a power cord and socket assembly 58 affixed to front hanger panel 46, which also includes a hole (now shown), aligned over and around front housing panel hole 54. The power cord and socket assembly includes a flexible power cord 60 with a plug 62 suitable for plugging into a female lamp cord receptacle on a light ballast.

Returning to the various views, front and rear hanging brackets 64, 66 are attached to the hanger 42 and socket and power cord assembly so that the entire assembly can be hung from a ceiling or other overhead elements.

It should be noted that upper bar 44 of hanger 42 is spaced apart from the open slot 30 in housing shell 12 so as to form an air gap 68 that brings the shell interior and exterior into fluid communication through ventilation slot 30, so as to induce cross flow of air across the top of the housing, thereby facilitating the flow of air out from the housing interior. The horizontal bar preferably includes upturned edges to further facilitate the escape of heated air and to encourage cross flow through the gap 68. Waste heat created by a grow light bulb 90 will thereby be able to escape the housing interior via air rising and exiting through the ventilation slot.

Referring next to FIGS. 3, 9-11, and 13, there is shown the interior portion 70 of the light housing. These views show that reflective (preferably specular) interior surface 28 of the housing shell and the reflective (preferably specular) interior surfaces 72, 74 of the front and rear housing panels 18, 20, respectively, define the interior space. Disposed immediately above a lamp 90 (FIG. 13 only) and immediately below ventilation slot 30 is a generally V-shaped reflective (preferably specular) baffle 76 affixed at its front and rear ends 78, 80 to front and rear housing panels 18, 20 using screw tabs 82, 84. The reflective baffle 76 is spaced downwardly from ventilation slot 30 sufficiently to allow the free flow of hot air up and through the slot and the air gap 68, while at the same time reflecting incident light IL from bulb 90, partially directly through the housing opening 92 and partially into the interior side 28 of the housing shell 12, wherein thereafter the reflected light RL exits through the opening 92, thereby minimizing both the loss of useful light and the creation of waste heat by incident light trapped, reflected back to the bulb and/or otherwise absorbed in, around, and above bulb 90.

From the foregoing, it will be appreciated that in its most essential aspect, the ventilated grow light housing of the present invention is A grow light with passive cooling that includes a housing shell having a reflective interior surface and defining an interior space in which a grow light bulb is disposed, said housing having a housing opening at a lower portion through which light from said grow light is directed downwardly onto plants, and further having at least one ventilation opening in an upper portion; a light power cord and socket assembly having a socket into which said grow light bulb is disposed when in use, such that said grow light bulb is substantially directly below said at least one ventilation opening; and a reflective baffle disposed between said at least one ventilation opening and said grow light bulb, said reflective baffle spaced apart from said upper portion and said reflective interior surface so as to form a gap through which air heated by said grow light bulb can flow before exiting said interior space through said at least one ventilation opening, said reflective baffle configured in such a way that incident light from said grow light bulb is reflected away from said at least one ventilation opening, downwardly into said interior space and either directly out said housing opening or indirectly out said housing opening after first reflecting off said reflective interior surface of said housing shell. In accordance with the invention, the grow light housing ensures that substantially all incident light produced by a grow light bulb is captured and transmitted into the plant growing environment, while waste heat is vented upwardly and away from the plants, all without having to employ any mechanical or electrical means that add to energy consumption.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A grow light with passive cooling, comprising:
   a housing shell including at least one curved panel and having a reflective interior surface that defines an interior space in which a grow light bulb is disposed, said housing shell having a housing opening at a lower portion through which light from said grow light is directed downwardly onto plants, and further having at least one ventilation opening in an upper portion;
   a light power cord and socket assembly having a socket into which said grow light bulb is disposed when in use, such that said grow light bulb is substantially directly below said at least one ventilation opening; and
   a reflective baffle disposed between said at least one ventilation opening and said grow light bulb, said reflective baffle spaced apart from said upper portion and said reflective interior surface so as to form a gap through which air heated by said grow light bulb can flow before exiting said interior space through said at least one ventilation opening, said reflective baffle configured in such a way that incident light from said grow light bulb is reflected away from said at least one ventilation opening, downwardly into said interior space and either directly out said housing opening or indirectly out said housing opening after first reflecting off said reflective interior surface of said housing shell.

2. The grow light of claim 1, wherein said at least one ventilation opening is an elongate slot disposed in an uppermost portion of said housing shell.

3. The grow light of claim 2, wherein said housing shell includes arcuate front and rear edges either substantially parabolic or substantially semicircular, front and rear housing panels, each of said front and rear housing panels having an arcuate edge substantially conforming to said front and rear edges of said housing shell and affixed to said housing shell, and wherein said ventilation slot is disposed at a vertex of said housing.

4. The grow light of claim 3, further including a hanger having a horizontally disposed longitudinal upper bar and front and rear hanger panels disposed on and affixed to the exterior of said housing shell.

5. The grow light of claim 4, wherein said front and rear hanger panels are conformed to provide a shelf onto which a transparent lens may be disposed.

6. The grow light of claim 4, wherein said upper bar is hanger bar is spaced apart from the open slot in housing shell so as to form an air flow gap that brings the shell interior and exterior into fluid communication through ventilation slot, thereby inducing a cross flow of air across the top of said housing, and wherein waste heat created by a grow light bulb will thereby be able to escape the housing interior via air rising and exiting through the ventilation slot.

7. The grow light of claim 1, wherein said light socket is included in a power cord and socket assembly affixed to said front hanger panel.

8. The grow light of claim 1, wherein said front housing panel includes a hole through which a light socket may be fully or partially disposed.

9. A grow light housing, comprising:
   a housing shell with a reflective interior surface, a light opening at a lower portion, and a ventilation opening at an uppermost portion of said housing shell;
   a grow light bulb disposed below said ventilation opening; and
   a reflective baffle interposed between said grow light bulb and ventilation opening and spaced apart from said housing shell so as to form an air gap through which rising heated air will flow before escaping said housing through said ventilation opening;
   wherein said housing includes a panel curved to have front and rear edges that are either substantially parabolic or substantially semicircular, front and rear housing panels, each of said front and rear housing panels having an arcuate edge substantially conforming to said front and rear edges of said housing shell and affixed to said housing shell, and wherein said ventilation opening is disposed at a vertex of said housing shell.

10. The grow light housing of claim 9, wherein said hanger includes front and rear hanger panels disposed exteriorly relative to said front and rear housing panels, respectively, and wherein each of said front and rear hanger panels includes a lower flange angled inwardly under said opening in said housing so as to form a shelf for placement of a lens.

* * * * *